July 17, 1956  J. IMBER  2,754,815

SPACE HEATING APPARATUS

Filed July 27, 1953

Inventor
Jack Imber
By Morris L. Peterman
Attorneys.

United States Patent Office 2,754,815
Patented July 17, 1956

2,754,815
SPACE HEATING APPARATUS

Jack Imber, Greenford, England, assignor to Imber Research Limited, Greenford, England, a British company Application July 27, 1953, Serial No. 370,477

Claims priority, application Great Britain October 9, 1952

2 Claims. (Cl. 126—96)

This invention relates to space heating apparatus and whilst adapted for use in particular with an oil heated convection heater is not so limited in its application but may also be incorporated in heaters employing gas or electricity and adapted to heat by convection or radiation or a combination of both.

A frequent criticism of space heating apparatuses which heat by convection is that whilst they are efficient in operation they do not convey a visual impression of warmth. The object of the invention is to avoid this disadvantage and provide means, adapted to be incorporated in a space heating apparatus, which will convey the impression of warmth by reflecting a warm colour and thereby simulate in some degree the appearance of warmth and comfort created by an open fire or a visible heating element.

According to the invention there is provided a space heating apparatus in which is incorporated a coloured panel, and a reflector, the latter being so shaped and arranged in relation to said panel as to reflect incident light thereon and also reflect an image of the coloured panel thus illuminated.

According to a further feature of the invention the said coloured panel is formed with an aperture for the chimney or hot-air duct of the heating apparatus whilst the reflector acts as a deflector for the hot air from the heater.

The invention also provides for the arrangement of the said reflector in such a manner that it will reflect an image of the burner or other heating element of the apparatus which can thereby be maintained under observation during adjustment.

According to yet another feature of the invention the said aperture in the coloured panel may be covered by a grille or ornamentation.

Reference will now be made to the accompanying drawings which illustrate a preferred embodiment of the invention and in which.

Figure 1:
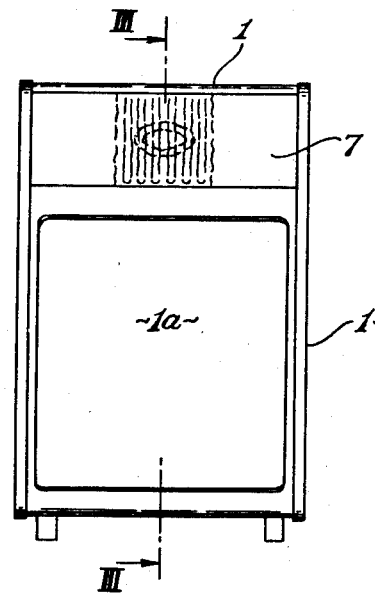
Fig. 1 is a front elevation of a convection heater incorporating the invention.
Figure 2:
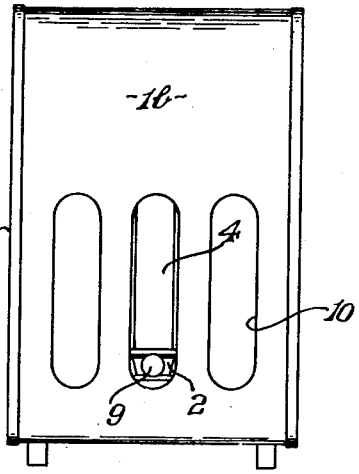
Fig. 2 is a rear elevation of the heater in Fig. 1.

In the preferred form the invention is embodied in a convection heater heated by a lamp type oil burner, conveniently of the blue flame type. The heater is formed as an enclosed casing 1 in the lower part of which is housed the burner 2 and the associated liquid fuel reservoir 3. The burner is provided with a vertically disposed tubular flue or chimney 4 the upper end of which terminates below a corresponding aperture 5 in a panel 6 disposed transversely in the upper part of the casing 1 and preferably inclined downwardly from front to rear. The upper portion of the front of the casing 1 is formed with a substantially rectangular opening, this being arranged at a level such that the said panel 6 is not directly visible when the casing 1 is viewed from the front. Also arranged in the upper portion of the casing is a reflector 7 which has a forward inclination from the bottom to the top thereof and is disposed with its bottom edge adjacent the rear edge of the said panel 6 whilst the upper edge of the reflector is above and slightly to the rear of the front edge of said panel 6.

Figure 3:
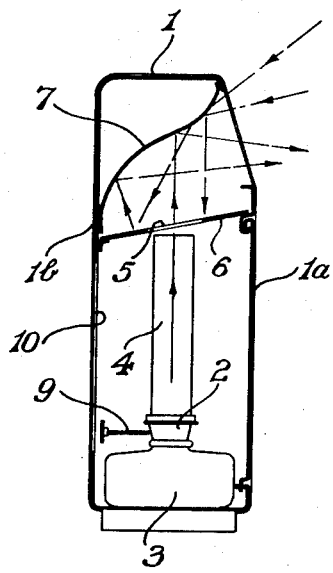
Fig. 3 is a sectional elevation on the line III—III of Fig. 1.

The said panel 6 is painted or otherwise coloured with a warm colour such as red, and the reflector 7 is curved in such a way as to reflect on to the coloured panel 6 the incident light from the surroundings of the heater and also to reflect towards a person viewing the heater an image of the coloured panel 6 illuminated in this way. The arrows indicated in Fig. 3 illustrate the manner in which the panel 6 is illuminated and an image thereof reflected in the reflector 7.

In this manner a person viewing the heater obtains a reflection in the reflector 7 of the coloured panel 6 (as indicated in Fig. 1), and the impression of warmth thereby created is obtained irrespective of whether the heater is or is not operating, and without the necessity for any additional illumination other than that from the surroundings of the heater.

The reflector 7 also acts as a deflector for the current of hot air provided by the heater and to a limited degree when heated by the convected hot air will serve to radiate heat to its surroundings.

Figure 4:
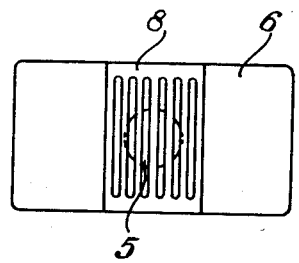
Fig. 4 is a plan view of the coloured panel and a grille therefor.

The said aperture 5 in the coloured panel 6 may also be covered with an ornamentation or grille 8 as shown in Fig. 4 which may be removable. The said grille 8 may be given a suitable decorative design, an image of which will be visible when viewing the reflector; the grille, apart from its decorative value, also serves to obscure from view the aperture 5 in the plate 6, when viewing the reflection in the reflector 7.

The aperture in the coloured panel 6 in conjunction with the reflector 7 provides a convenient means for viewing the oil burner 2 of the heater by showing a reflection of the burner viewed down the flue or chimney 4, the grille 8 being temporarily removed for this purpose. In this way it is possible to dispense with the provision of a viewing aperture at the front of the heater, such as is normally provided in heaters of this kind, for use when regulating the flame of the burner 2 by means of the wick control knob 9. Thus the front panel 1a of the casing 1 in which the burner 2 and reservoir 3 are housed may be a flat uninterrupted surface which gives a pleasing appearance and reduces the cost of manufacture. The front panel 1a is preferably detachable to enable the burner 2 and reservoir 3 to be removed.

When the apparatus is provided with an electric heating element the aperture 5 in the panel 6 may, if desired, be dispensed with, as also the removable grille 8.

The back 1b of the casing 1 in which the burner 2 is arranged is conveniently provided with openings 10 for the delivery of air to the burner 2.

If desired, the front panel 1a may be provided with a handle, to facilitate removal from the casing 1, and the latter may also be provided with one or a pair of carrying handles. These features are omitted from the drawing.

It will be understood that whilst suitable in particular for an oil burner as described above the invention may equally be applied to convection heaters employing gas or electricity.

I claim:

1. A space heating apparatus comprising a casing including a front panel terminating at a point below the top of the casing to define an aperture in the upper portion of the casing, a rear panel having openings for admission of air for combustion and air to be heated, side panels, upper and lower panels, a heating element disposed in the base of the casing, a colored panel situated within the casing above the heating element but below the aperture defined by the front panel and having an aperture therein for escape of heated air, and a curved reflector disposed above said colored panel and fixed at its lower edge to the rear panel and fixed at its upper edge to the top panel adjacent the upper edge of said aperture defined by the front panel.

2. A space heating apparatus as defined in claim 1, wherein said heating element comprises a lamp type oil burner.

References Cited in the file of this patent

UNITED STATES PATENTS

| | | |
|---|---|---|
| 462,132 | Hickox | Oct. 27, 1891 |
| 536,757 | Myers | Apr. 2, 1895 |
| 1,531,171 | Berry et al. | Mar. 24, 1925 |
| 1,586,597 | Berry | June 1, 1926 |